(12) United States Patent
Agnes et al.

(10) Patent No.: US 9,935,560 B2
(45) Date of Patent: Apr. 3, 2018

(54) ELECTRONIC DEVICE WITH A MAINTAIN POWER SIGNATURE (MPS) DEVICE AND ASSOCIATED METHODS

(71) Applicant: STMICROELECTRONICS S.r.l., Agrate Brianza (MB) (IT)

(72) Inventors: Andrea Agnes, Pavia (IT); Christian Beia, Somma Lombardo (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 176 days.

(21) Appl. No.: 14/856,686

(22) Filed: Sep. 17, 2015

(65) Prior Publication Data
US 2017/0085192 A1 Mar. 23, 2017

(51) Int. Cl.
| | |
|---|---|
| H02M 7/00 | (2006.01) |
| H02M 7/06 | (2006.01) |
| H02M 3/07 | (2006.01) |
| H02M 7/217 | (2006.01) |
| G05F 3/24 | (2006.01) |
| G06F 1/26 | (2006.01) |
| H04L 12/10 | (2006.01) |
| H04L 12/40 | (2006.01) |

(52) U.S. Cl.
CPC ............... *H02M 7/06* (2013.01); *G05F 3/24* (2013.01); *G06F 1/266* (2013.01); *H02M 3/07* (2013.01); *H02M 7/217* (2013.01); *H04L 12/10* (2013.01); *H04L 12/40045* (2013.01)

(58) Field of Classification Search
CPC .......... H02M 7/06; H02M 3/07; H02M 7/217; H04L 12/10; H04L 41/12; H04L 43/08; H04L 12/40045; G06F 1/26; G06F 1/189; G06F 1/266; G06F 1/3203; G05F 3/24
See application file for complete search history.

(56) References Cited

U.S. PATENT DOCUMENTS

| | | | |
|---|---|---|---|
| 7,091,770 | B2 | 8/2006 | Schlaffer |
| 7,490,251 | B2 | 2/2009 | Lum et al. |
| 8,064,179 | B2 | 11/2011 | Apfel |
| 2007/0263675 | A1 | 11/2007 | Lum et al. |
| 2008/0276104 | A1 | 11/2008 | Hussain et al. |
| 2011/0125341 | A1 | 5/2011 | Heath et al. |
| 2014/0084661 | A1 | 3/2014 | Vigna et al. |
| 2014/0084681 | A1 | 3/2014 | Vigna et al. |

FOREIGN PATENT DOCUMENTS

WO      03091818 A1    11/2003

OTHER PUBLICATIONS

Linear Technology LT4321POE Ideal Diode Bridge Controller: www.linear.com/LT4321; 12 pgs. Retrieved From Internet Sep. 14, 2015.

*Primary Examiner* — Henry Lee, III
(74) *Attorney, Agent, or Firm* — Slater Matsil, LLP

(57) ABSTRACT

An electronic device includes a rectifier bridge that includes an input configured to be coupled to power over Ethernet (PoE) power sourcing equipment (PSE), and an output. A transistor is configured to selectively couple the output with a load. The electronic device includes a maintain power signature (MPS) device, and a control circuit. The control circuit is to maintain the transistor on when a load current is above a threshold, source current from the rectifier bridge to the MPS device when the load current is below the threshold, and switch the transistor to a diode configuration when the load current is below the threshold.

24 Claims, 2 Drawing Sheets

ELECTRONIC DEVICE WITH A MAINTAIN POWER SIGNATURE (MPS) DEVICE AND ASSOCIATED METHODS

FIELD OF THE INVENTION

The present invention relates generally to Power over Ethernet (PoE) technology, and more particularly, to an electronic device with a maintain power signature (MPS) device and related methods.

BACKGROUND OF THE INVENTION

Power over Ethernet (PoE) technology is directed to passing electrical power, along with data, on Ethernet cabling. PoE technology is typically regulated by the IEEE 802.3 standard. Power is supplied in common mode over two or more of the differential pairs of wires found in the Ethernet cabling and comes from a power supply within a PoE-enabled networking device, such as an Ethernet switch, or can be injected into a cable run with a midspan power supply.

The basic elements of a PoE system include power sourcing equipment (PSE), which provides power on the Ethernet cable, and a powered device (PD) powered by the power sourcing equipment that consumes energy from the power sourcing equipment over the Ethernet cabling. Examples of powered devices include wireless access points, Internet protocol (IP) telephones, and IP cameras.

The power sourcing equipment performs a detection procedure to detect whether the powered device is a valid powered device that may be provided with power. The power sourcing equipment determines if the powered device is valid based on receiving a valid detection signal from the powered device. For example, the detection signal has a maximum resistance of 26.3 kohms and a maximum capacitance of 120 nF.

In accordance with the IEEE 802.3-2012 standard, the power sourcing equipment uses a maintain power signature (MPS) operation to determine if a powered device continues to require power after the power was provided to the powered device. The maintain power signature requires the powered device to periodically draw at least 10 mA.

One approach for a maintain power signature operation is provided by an electronic device 20 that includes a rectifier bridge 30 comprising an input 32 configured to be coupled to PoE power sourcing equipment via Ethernet cabling 34, and an output 36, as illustrated in FIG. 1. A transistor 40 selectively connects and disconnects the output 36 with a load 50. A parasitic diode 48 is associated with the transistor 40. When the transistor 40 is connected to the supply voltage (VDD) leg, a charge pump 60 is used to increase the voltage being applied to a control terminal 41 of the transistor 40.

The load 50 may be a power converter, such as a DC/DC converter, that generates a power output required by the powered device. The powered device is connectable to the power converter. The load 50 includes a load capacitance 52 as a low frequency filter. The load capacitance 52 may have a value of 100 μF, for example, and is charged to the supply voltage (VDD).

The electronic device 20 includes a maintain power signature device 70 which is configured as a current source to be connected across the rectifier bridge 30. When the load 50 periodically draws less than 10 mA, then a control circuit 80 is configured to enable the maintain power signature device 70 by generating a control signal to a maintain power signature switch 72 coupled in series with the maintain power signature device 70. With the maintain power signature device 70 enabled, the current consumption of the maintain power signature device increases the total current so as to reach 10 mA. In this configuration, the effect of a voltage droop is current sharing from the Ethernet cabling 34 via the rectifier bridge (path 1) and from the load capacitance 52 (path 2). However, more current is provided by the load capacitance 52 instead of from the power sourcing equipment because of the rectifier bridge 30.

Consequently, there is a need to cancel the current from the load capacitance 52 and provide an adequate flow of current from the power sourcing equipment over the Ethernet cabling 34.

The current IEEE 802.3-at standard allows for a maintain power signature current consumption of 10 mA for a minimum of 75 msec and for a maximum cycle of 250 msec. A voltage droop in the supply voltage (VDD) from the power sourcing equipment allows the load capacitance 52 to discharge current for a time period that reduces duration of the pulse of current for the maintain power signature.

SUMMARY OF THE INVENTION

An electronic device includes a rectifier bridge comprising an input configured to be coupled to power over Ethernet (PoE) power sourcing equipment (PSE), and an output. A transistor may be configured to selectively couple the output with a load. The electronic device may include a maintain power signature (MPS) device. A control circuit may be configured to maintain the transistor on when a load current is above a threshold, source current from the rectifier bridge to the MPS device when the load current is below the threshold, and switch the transistor to a diode configuration when the load current is below the threshold. To place the transistor in a diode configuration, a short is placed between a control terminal (e.g., gate) and a conduction terminal (e.g., drain) of the transistor).

The load may include a load capacitance connected in parallel to the load. The load capacitance may be charged to a supply voltage (VDD) as provided by the power sourcing equipment. When the control circuit switches the transistor to the diode configuration, a voltage droop in the supply voltage prevents current flowing from the load capacitance while providing an adequate flow of current from the power sourcing equipment over the Ethernet cabling.

The control circuit may generate a control signal when the load current is below the threshold. The transistor may comprise a first conduction terminal, a second conduction terminal, and a control terminal. The electronic device may further comprise a switch coupled between the first conduction terminal and the control terminal to switch the transistor to the diode configuration based on the control signal. The transistor may comprises a MOSFET, with the first conduction terminal defining a drain, the second conduction terminal defining a source, and the control terminal defining a gate.

The control circuit may generate a control signal when the load current is below the threshold. The electronic device may further comprise an MPS switch coupled in series with the MPS device based on the control signal so that the MPS device is coupled across the rectifier bridge. The MPS device may comprise a pulsed current source. The period and duty cycle of which may be in accordance with the relevant standard.

The electronic device may further comprise a second transistor coupled in series with the transistor between the rectifier bridge and the output. The control circuit may be further configured to maintain the second transistor on when the load current is above the threshold. The transistor may comprise a first conduction terminal coupled to the rectifier bridge, a second conduction terminal, and a control terminal. The second transistor may comprise a first conduction terminal coupled to the output, a second conduction terminal coupled to the second conduction terminal of the transistor, and a control terminal coupled to the control terminal of the transistor.

The electronic device may further comprise a charge pump circuit coupled between the rectifier bridge and the transistor. The load may comprise a power converter connectable to a powered device that is to be powered by the PSE. The power converter may comprise a DC/DC converter, for example.

Another aspect is directed to an electronic device comprising a rectifier bridge comprising an input configured to be coupled to power over Ethernet (PoE) power sourcing equipment (PSE), and an output. A transistor may be configured to selectively couple the output with a load, with the transistor comprising a first conduction terminal, a second conduction terminal, and a control terminal. The electronic device may include a maintain power signature (MPS) device, and an MPS switch coupled in series with the MPS device. A switch may be selectively coupled to the first conduction terminal and the control terminal of the transistor. A control circuit may be configured to maintain the transistor on when a load current is above a threshold, operate the MPS switch so as to source current from the rectifier bridge to the MPS device when the load current is below the threshold, and operate the switch so as to place the transistor in a diode configuration when the load current is below the threshold.

Yet another aspect is directed to a method for providing power to a load using an electronic device as described above. The method comprises coupling the input of the rectifier bridge to power over Ethernet (PoE) power sourcing equipment (PSE), and maintaining the transistor on when a load current is above a threshold. The method may further comprise sourcing current from the rectifier bridge to the MPS device when the load current is below the threshold, and switching the transistor to a diode configuration when the load current is below the threshold.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
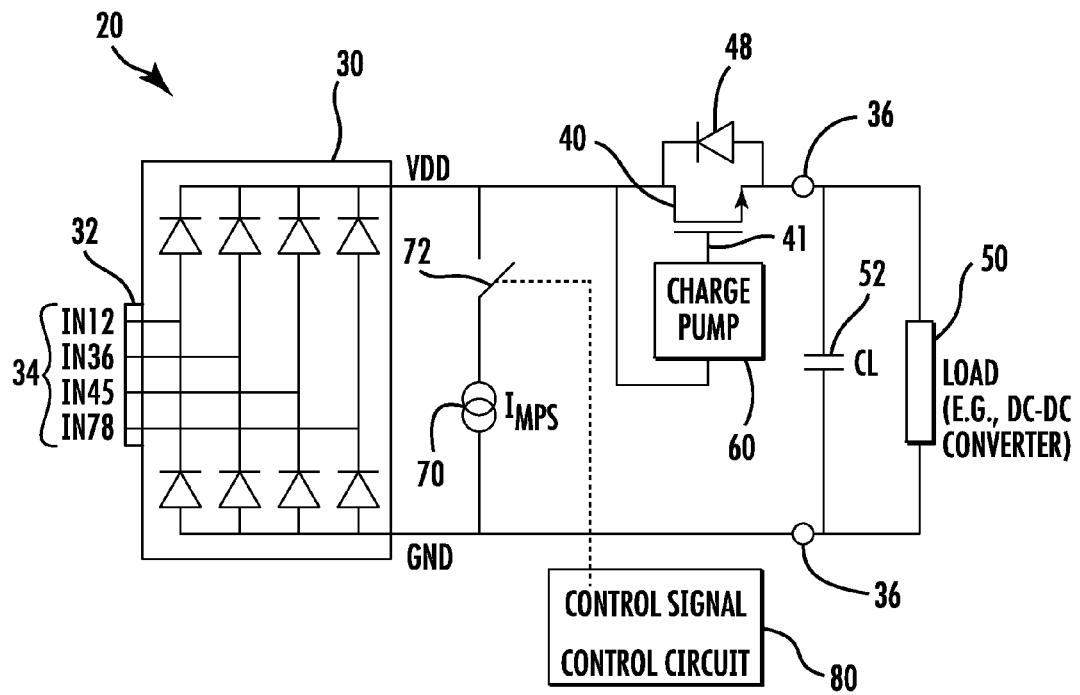
FIG. 1 is a schematic diagram of an electronic device with a maintain power signature (MPS) device in accordance with the prior art.
Figure 2:
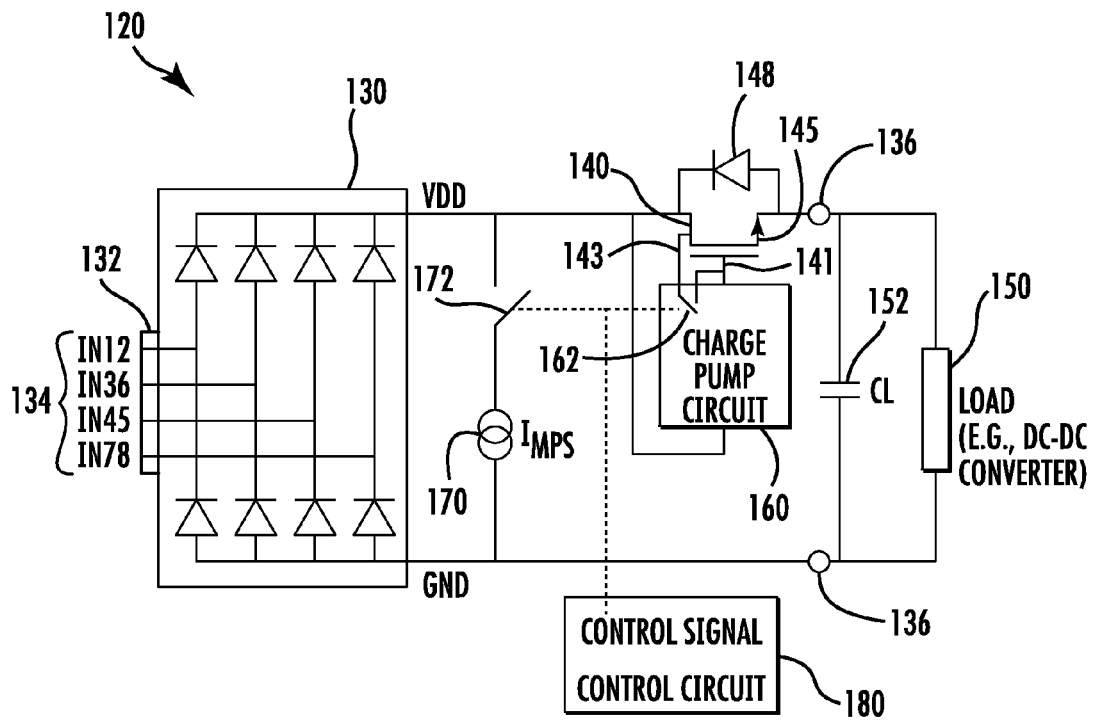
FIG. 2 is a schematic diagram of an electronic device with a maintain power signature (MPS) device in accordance with the present invention.

Referring now to FIG. 2, an electronic device 120 includes a rectifier bridge 130 comprising an input 132 configured to be coupled to power over Ethernet (PoE) power sourcing equipment (PSE), and an output 136. A transistor 140 is configured to selectively couple the output 136 with a load 150. The electronic device 120 includes a maintain power signature (MPS) device 170 and a control circuit 180. The control circuit 180 is configured to maintain the transistor 140 on when a load current is above a threshold, source current from the rectifier bridge 130 to the maintain power signature device 170 when the load current is below the threshold, and switch the transistor 140 to a diode configuration when the load current is below the threshold.

The load 150 includes a load capacitance 152 connected in parallel to the load. The load capacitance 152 functions as a low frequency filter and is charged to a supply voltage (VDD) as provided by the power sourcing equipment.

When the control circuit 180 switches the transistor 140 to the diode configuration, this reduces voltage across the load capacitance 152 while providing an adequate flow of current from the power sourcing equipment over the Ethernet cabling. This configuration blocks an inverse current from the load capacitance 152 to the maintain power signature device 170 as long as the voltage droop in the supply voltage from the power sourcing equipment since is lower than $\text{Vth}_{transistor}$. In other words, the effect of a voltage droop up to $\text{Vth}_{transistor}$ in the supply voltage is negligible current from the load capacitance 152 to the maintain power signature device 170 when the transistor 140 is in a diode configuration.

The load 150 may be a power converter connectable to a powered device that is to be powered by the power sourcing equipment. The power converter may be a DC/DC converter, for example. Examples of powered devices include wireless access points, Internet protocol (IP) telephones, and IP cameras.

The transistor 140 may be on the power supply (VDD) leg, as illustrated. Alternatively, the transistor 140 may be placed on the low side leg, such as ground, for example. The transistor 140 is an n-channel MOSFET with a drain 143 connected to the rectifier bridge 130, and a source 145 connected to the output 136. A parasitic diode 148 is associated with the transistor 140.

Since the transistor 140 is on the power supply (VDD) leg, a charge pump circuit 160 is coupled between the power supply leg and a gate 141 of the transistor 140. The charge pump circuit 160 increases the voltage applied to the gate 141 of the transistor 140. For example, the charge pump circuit 160 increases the power supply voltage (VDD) by 10 volts, i.e., VDD +10 volts.

As readily appreciated by those skilled in the art, the power sourcing equipment uses a maintain power signature operation to determine if the powered device continues to require power after the power was provided to the powered device. Consequently, the load current needs to be above the threshold. The threshold is 10 mA based on the IEEE 802.3 standard. Nonetheless, the illustrated electronic device 120 is not limited to this threshold in other applications.

When the transistor 140 is on and the load 150 requires a load current greater than 10 mA, then no additional maintain power signature current is needed for keeping power from the power sourcing equipment. However, if the transistor 140 is on and the load 150 has a load current that is less than 10 mA, then the maintain power signature device 170 is enabled by the control circuit 180. The current consumption of the maintain power signature device 180 increases the total current required by the load 150 to the power sourcing equipment with the purpose of reaching 10 mA. This is a required minimal current for keeping the power on.

The maintain power signature device 180 is configured as a pulsed current source and is in series with a maintain power signature switch 172. The maintain power signature switch 172 is selectively enabled by the control circuit to connect the maintain power signature device 180 across the rectifier bridge 130. The control circuit 180 generates a control signal that is applied to the maintain power signature switch 172.

At the same time, the control signal is also used to provide a direct connection between the gate 141 and the drain 143 of the transistor. For illustration purposes, the control signal is applied to the charge pump circuit 160 which provides the direct connection. The charge pump circuit 160 is configured to include a switch 162 that is connected across that gate 141 and the drain 143 based on the control signal. Alternatively, the switch 162 may be external the charge pump circuit 160. With the transistor 140 configured as a diode, the output voltage (VOUT) can reach a maximum voltage of VDD-$Vth_{transistor}$.

Figure 3:
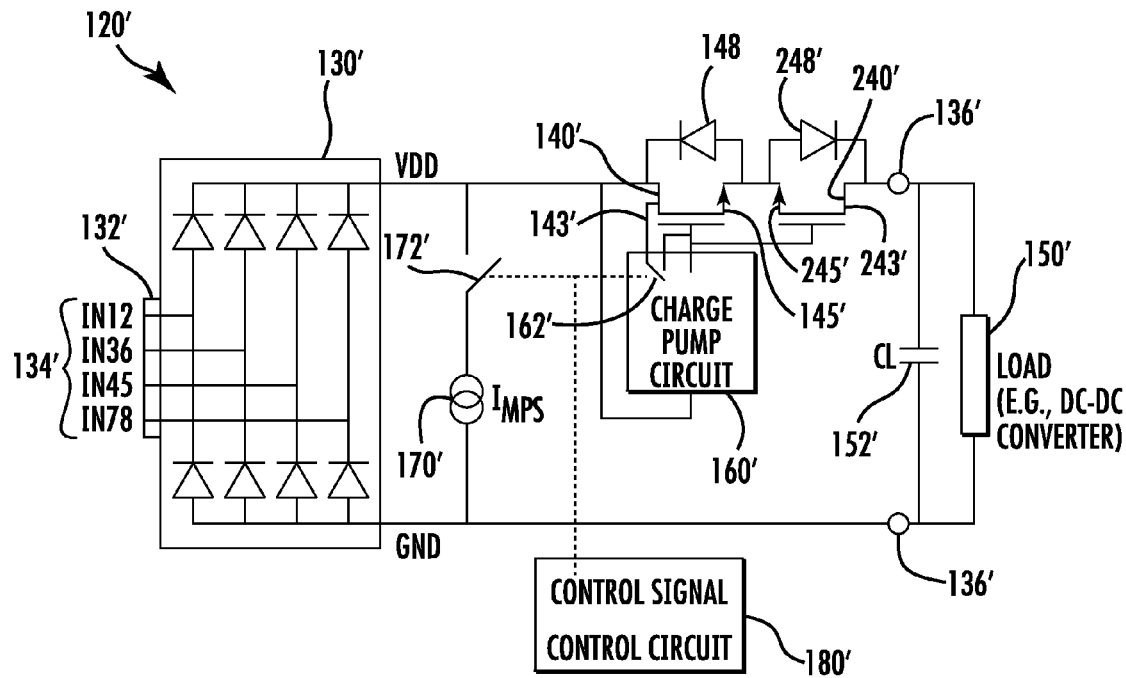
FIG. 3 is a schematic diagram of another embodiment of the electronic device illustrated in FIG. 2 with two transistors coupled in series.

Referring now to FIG. 3, another embodiment of the electronic device 120' includes two transistors 140', 240' connected in series. The second transistor 240' allows an inverse current to be blocked when the voltage droop in the supply voltage is greater than $Vth_{transistor}$. In particular, the second transistor 240' can block the inverse current also if the output voltage (VOUT) is kept greater than VDD by an auxiliary supply voltage applied to VOUT. In the latter case the control circuit 180' is configured to maintain the second transistor 240' on when the current which flows through the transistor is above the threshold.

The second transistor 240' is also an n-channel MOSFET with a drain 243', a source 245', and a gate 241'. A parasitic diode 248' is associated with the second transistor 240'. The source 245' of the second transistor 240' is coupled to the source 145' of the first transistor 140', and the drain 243' of the second transistor 240' is coupled to the output 136'. The gates 141', 241' of the first and second transistors 140', 240' are both coupled together and to the charge pump circuit 160'.

Figure 4:
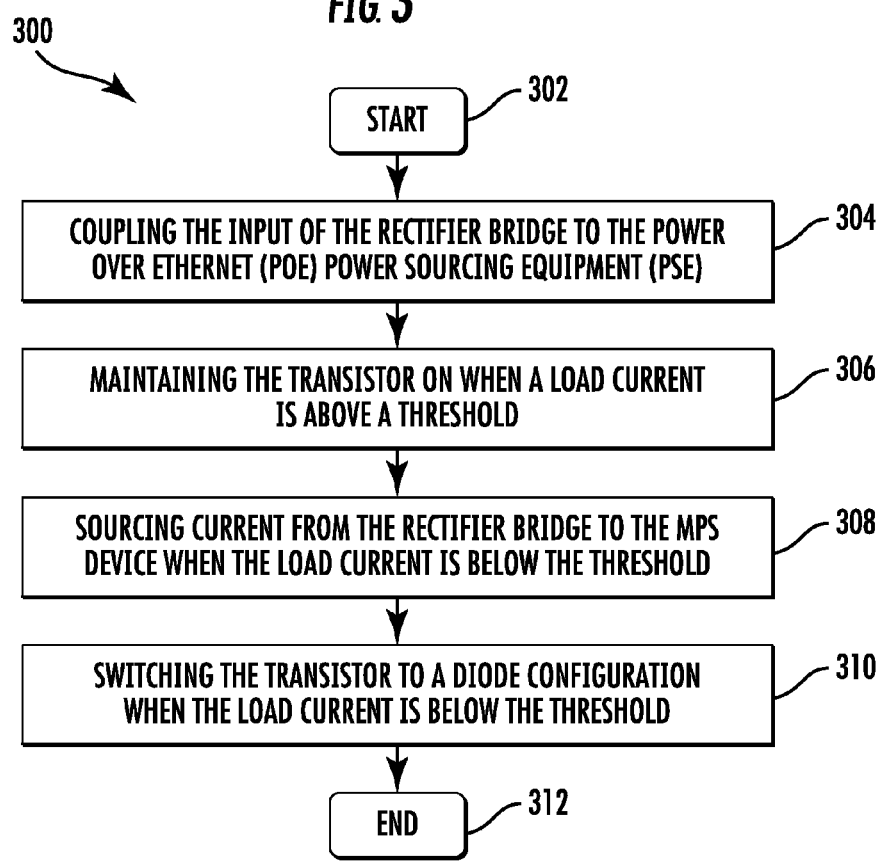
FIG. 4 is a flowchart illustrating a method for providing power to a load using the electronic device illustrated in FIG. 2.

Referring now to the flowchart 300 illustrated in FIG. 4, a method for providing power to a load 150 using the above described electronic device 120 will be discussed. From the start (Block 302), the method comprises coupling the input 132 of the rectifier bridge 130 to the power over Ethernet (PoE) power sourcing equipment (PSE) at Block 304. The transistor 140 is maintained on at Block 306 when a load current is above a threshold. The method further comprises sourcing current from the rectifier bridge 130 to the MPS device 170 when the load current is below the threshold at Block 308, and switching the transistor 140 to a diode configuration when the load current is below the threshold at Block 310. The method ends at Block 312.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
    a rectifier bridge comprising an input configured to be coupled to power over Ethernet (PoE) power sourcing equipment (PSE), and an output;
    a transistor configured to selectively couple the output with a load;
    a maintain power signature (MPS) device; and
    a control circuit configured to
        maintain the transistor on when a load current is above a threshold,
        source current from the rectifier bridge to the MPS device when the load current is below the threshold, and
        switch the transistor to a diode configuration when the load current is below the threshold, wherein the control circuit generates a control signal when the load current is below the threshold, wherein the transistor comprises a first conduction terminal, a second conduction terminal, and a control terminal, and wherein the electronic device further comprises a switch coupled between the first conduction terminal and the control terminal to switch the transistor to the diode configuration based on the control signal.

2. The electronic device according to claim 1, wherein the transistor comprises a MOSFET, with the first conduction terminal defining a drain, the second conduction terminal defining a source, and the control terminal defining a gate.

3. The electronic device according to claim 1, further comprising an MPS switch coupled in series with the MPS device based on the control signal so that the MPS device is coupled across the rectifier bridge.

4. The electronic device according to claim 1, wherein the MPS device comprises a current source that is coupled across the rectifier bridge when the load current is below the threshold.

5. The electronic device according to claim 1, further comprising a second transistor coupled in series with the transistor between the rectifier bridge and the output; and wherein the control circuit is further configured to maintain the second transistor on when the load current is above the threshold.

6. The electronic device according to claim 5, wherein the first conduction terminal of the transistor is coupled to the rectifier bridge; and wherein the second transistor comprises a first conduction terminal coupled to the output, a second conduction terminal coupled to the second conduction terminal of the transistor, and a control terminal coupled to the control terminal of the transistor.

7. The electronic device according to claim 1, further comprising a charge pump circuit coupled between the rectifier bridge and the transistor.

8. The electronic device according to claim 1, wherein the load comprises a power converter connectable to a powered device that is to be powered by the PSE.

9. An electronic device comprising:
    a rectifier bridge comprising an input configured to be coupled to power over Ethernet (PoE) power sourcing equipment (PSE), and an output;
    a transistor configured to selectively couple the output with a load, the transistor comprising a first conduction terminal, a second conduction terminal, and a control terminal;

a maintain power signature (MPS) device;
an MPS switch coupled to the MPS device;
a switch coupled between the first conduction terminal and the control terminal of the transistor; and
a control circuit configured to maintain the transistor on when a load current is above a threshold,
operate the MPS switch so as to source current from the rectifier bridge to the MPS device when the load current is below the threshold, and
operate the switch so as to place the transistor in a diode configuration when the load current is below the threshold.

10. The electronic device according to claim 9, wherein the transistor comprises a MOSFET, with the first conduction terminal defining a drain, the second conduction terminal defining a source, and the control terminal defining a gate.

11. The electronic device according to claim 9, wherein the control circuit generates a control signal when the load current is below the threshold for operating the MPS switch and the switch.

12. The electronic device according to claim 9, wherein the MPS device comprises a current source that is coupled across the rectifier bridge when the MPS switch is operated.

13. The electronic device according to claim 9, further comprising a second transistor coupled in series with the transistor between the rectifier bridge and the output; and wherein the control circuit is further configured to maintain the second transistor on when the load current is above the threshold.

14. The electronic device according to claim 13, wherein the transistor comprises a first conduction terminal coupled to the rectifier bridge, a second conduction terminal, and a control terminal; and wherein the second transistor comprises a first conduction terminal coupled to the output, a second conduction terminal coupled to the second conduction terminal of the transistor, and a control terminal coupled to the control terminal of the transistor.

15. The electronic device according to claim 9, wherein the load comprises a power converter connectable to a powered device that is to be powered by the PSE.

16. A method for providing power to a load using an electronic device comprising a rectifier bridge comprising an input to be coupled to power over Ethernet (PoE) power sourcing equipment (PSE), and an output; a transistor comprising a first conduction terminal, a second conduction terminal, and a control terminal, the transistor configured to selectively couple the output with the load; and a maintain power signature (MPS) device; the method comprising:
maintaining the transistor on when a load current is above a threshold;
sourcing current from the rectifier bridge to the MPS device when the load current is below the threshold; and
switching the transistor to a diode configuration when the load current is below the threshold, wherein the electronic device further comprises a control circuit for generating a control signal when the load current is below the threshold, and a switch that is coupled between the first conduction terminal and the control terminal based on the control signal to switch the transistor to the diode configuration.

17. The method according to claim 16, wherein the transistor comprises a MOSFET, with the first conduction terminal defining a drain, the second conduction terminal defining a source, and the control terminal defining a gate.

18. The method according to claim 16, wherein the electronic device further comprises an MPS switch that is selectively coupled in series with the MPS device based on the control signal so that the MPS device is coupled across the rectifier bridge.

19. The method according to claim 16, wherein the MPS device comprises a current source that is coupled across the rectifier bridge when the load current is below the threshold.

20. The method according to claim 16, wherein the electronic device further comprises a second transistor coupled in series with the transistor between the rectifier bridge and the output, the method further comprising maintaining the second transistor on when the load current is above the threshold.

21. The method according to claim 20, wherein the transistor comprises a first conduction terminal coupled to the rectifier bridge, a second conduction terminal, and a control terminal; and wherein the second transistor comprises a first conduction terminal coupled to the output, a second conduction terminal coupled to the second conduction terminal of the transistor, and a control terminal coupled to the control terminal of the transistor.

22. The method according to claim 16, wherein the load comprises a power converter connectable to a powered device that is to be powered by the PSE.

23. The electronic device according to claim 9, wherein operating the switch so as to place the transistor in a diode configuration when the load current is below the threshold comprises generating a control signal by the control circuit; and the switch connects the first conduction terminal and the control terminal of the transistor based on the control signal.

24. The electronic device according to claim 9, further comprising a charge pump circuit coupled between the rectifier bridge and the transistor, the charge pump circuit comprising the switch.

* * * * *